(12) United States Patent
Ha et al.

(10) Patent No.: US 11,663,796 B2
(45) Date of Patent: *May 30, 2023

(54) METHOD AND APPARATUS WITH LIGHT SOURCE INFORMATION OUTPUT

(71) Applicants: SAMSUNG ELECTRONICS CO., LTD., Suwon-si (KR); Korea Advanced Institute of Science and Technology, Daejeon (KR)

(72) Inventors: Inwoo Ha, Seongnam-si (KR); Changho Jo, Daejeon (KR); Jaeyoon Kim, Daejeon (KR); Sungeui Yoon, Daejeon (KR); Sunghoon Hong, Hwaseong-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 273 days.

This patent is subject to a terminal disclaimer.

(21) Appl. No.: 17/085,349

(22) Filed: Oct. 30, 2020

(65) Prior Publication Data

US 2021/0319252 A1 Oct. 14, 2021

(30) Foreign Application Priority Data

Apr. 13, 2020 (KR) .................. 10-2020-0044635

(51) Int. Cl.
  *G06K 9/46* (2006.01)
  *G06K 9/00* (2022.01)
  *G06K 9/20* (2006.01)
  *G06T 7/70* (2017.01)
  *G06T 7/50* (2017.01)
  *G06T 19/00* (2011.01)
  *G06N 3/08* (2023.01)
  (Continued)

(52) U.S. Cl.
  CPC ............... *G06V 10/60* (2022.01); *G06N 3/04* (2013.01); *G06N 3/08* (2013.01); *G06T 7/50* (2017.01); *G06T 7/70* (2017.01); *G06T 19/006* (2013.01); *G06V 10/22* (2022.01); *G06V 20/00* (2022.01); *G06T 2200/24* (2013.01); *G06T 2207/20081* (2013.01); *G06T 2207/20084* (2013.01)

(58) Field of Classification Search
  CPC ............ G06N 3/049; G06N 3/02; G06N 3/08; G06N 20/00; G06N 3/088; G06N 5/022
  See application file for complete search history.

(56) References Cited

U.S. PATENT DOCUMENTS 10,573,067 B1 * 2/2020 Naik .................. G06V 10/28
10,950,036 B2 * 3/2021 Ha ..................... G06T 15/50
(Continued)

FOREIGN PATENT DOCUMENTS

JP 10-253448 A 9/1998
JP 4077869 B2 4/2008
(Continued)

*Primary Examiner* — Todd Buttram
(74) *Attorney, Agent, or Firm* — NSIP Law

(57) ABSTRACT

A processor-implemented light source information output method includes: receiving an input image; detecting, using a trained neural network, at least one object in the input image; estimating, using the trained neural network, light source information of a light source corresponding to the at least one object; and outputting the light source information.

23 Claims, 6 Drawing Sheets

(51) Int. Cl.
*G06N 3/04* (2023.01)
*G06V 10/60* (2022.01)
*G06V 10/22* (2022.01)
*G06V 20/00* (2022.01)

(56) References Cited

U.S. PATENT DOCUMENTS

| | | | | |
|---|---|---|---|---|
| 2009/0244513 | A1* | 10/2009 | Matsumoto | G03F 9/7088 |
| | | | | 356/615 |
| 2015/0204977 | A1* | 7/2015 | Sakai | G01S 17/931 |
| | | | | 356/4.01 |
| 2015/0332655 | A1* | 11/2015 | Krus | G06F 1/3206 |
| | | | | 345/207 |
| 2016/0191877 | A1* | 6/2016 | Ono | G09F 19/18 |
| | | | | 348/744 |
| 2019/0304172 | A1* | 10/2019 | Ha | G06T 7/50 |
| 2020/0018707 | A1* | 1/2020 | Hanabusa | F21V 7/043 |
| 2020/0380787 | A1* | 12/2020 | Croxford | G06T 19/006 |
| 2020/0405148 | A1* | 12/2020 | Tran | A61B 3/0016 |
| 2021/0319252 | A1* | 10/2021 | Ha | G06V 10/60 |
| 2021/0390673 | A1* | 12/2021 | Ban | G06T 7/194 |

FOREIGN PATENT DOCUMENTS

| | | |
|---|---|---|
| JP | 2008-107087 A | 5/2008 |
| JP | 2015-210538 A | 11/2015 |
| KR | 10-1582086 B1 | 1/2016 |
| KR | 10-2019-0112894 A | 10/2019 |

* cited by examiner

METHOD AND APPARATUS WITH LIGHT SOURCE INFORMATION OUTPUT

CROSS-REFERENCE TO RELATED APPLICATIONS

This application claims the benefit under 35 USC § 119(a) of Korean Patent Application No. 10-2020-0044635, filed on Apr. 13, 2020, in the Korean Intellectual Property Office, the entire disclosure of which is incorporated herein by reference for all purposes.

BACKGROUND

1. Field

The following description relates to a method and apparatus with light source information output.

2. Description of Related Art

A virtual object and/or augmented reality (AR) object synthesized with a three-dimensional (3D) image may be used for content related to, for example, gaming, or medical diagnosis and treatment. When the virtual object and/or the AR object is synthesized with the 3D image, an effect of a light source may determine how natural or real the virtual object and/or the AR object appears in the 3D image. 3D rendering, which may be include estimating the light source and applying the estimated light source to the virtual object and/or the AR object, may determine how natural or real the virtual object and/or the AR object appears in the 3D image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented light source information output method includes: receiving an input image; detecting, using a trained neural network, at least one object in the input image; estimating, using the trained neural network, light source information of a light source corresponding to the at least one object; and outputting the light source information.

The estimating of the light source information may include estimating the light source information of the light source corresponding to the at least one object irrespective of whether the light source is included in the input image.

The estimating of the light source information may include estimating, based on an object region, light source information of a light source corresponding to the object region, wherein the object region corresponds to the at least one object detected in the input image.

The detecting of the at least one object may include detecting shadow information generated by the at least one object in the object region, and the estimating of the light source information is based on the detected shadow information.

The detecting of the at least one object may include detecting shading information on the at least one object in the object region, and the estimating of the light source information may be based on the detected shading information.

The detecting, using the trained neural network, of the at least one object in the input image may include generating a bounding box and detecting object information including an object region corresponding to the at least one object in the input image, and the estimating, using the trained neural network, of the light source information of the light source corresponding to the at least one object is based on a brightness of light of the light source.

The estimating, using the trained neural network, of the light source information of the light source may be in response to the brightness of the light of the light source being greater than a preset threshold.

The object information may include any one or any combination of a position of the at least one object, a size of the at least one object, and a class of the at least one object.

The light source information may include any one or any combination of a position of the light source, a distance to the light source, a brightness or an intensity of the light source, and a radiation direction of the light source.

The neural network may be trained to estimate the light source based on a template predefined based on at least one of a type of the light source and a type of a medium for transferring light by the light source.

The neural network may be trained to estimate the light source information based on a template in which a direction of a shadow generated by the at least one object corresponding to a radiation direction of the light source is pre-labeled.

The light source information may include a lighting parameter corresponding to each of a relative position of a light source corresponding to each of the at least one object, a distance to the light source, a brightness of the light source, and a radiation direction of the light source with respect to the at least one object.

The light source may include either one or both of direct light and indirect light.

The input image may include sequential partial images that comprise any one or any combination of at least one light source and the at least one object.

The estimating of the light source information may include estimating the light source information based on a change in a shadow caused by a change in light of the light source in a region of the at least one object included in the sequential partial images.

The method may include: receiving, as an input, a selection of a three-dimensional (3D) object from a user; and rendering the 3D object in the input image based on the light source information.

The estimating of the light source information may include partitioning the input image into grids and estimating the light source information for each of the grids, and the rendering of the 3D object may include: determining, based on the light source information estimated for each of the grids, a position in which the 3D object is to be disposed in the input image; and rendering the 3D object in the determined position.

The neural network may include any one or any combination of a deep neural network (DNN), a convolutional long short-term memory (LSTM) neural network, and a recurrent neural network (RNN).

A non-transitory computer-readable storage medium may store instructions that, when executed by a processor, configure the processor to perform the method.

In another general aspect, a light source information output apparatus includes: a communication interface configured to receive an input image; and a processor configured to: detect, using a trained neural network, at least one object in the input image; and estimate, using the trained neural network, light source information of a light source corresponding to the at least one object, wherein the communication interface is configured to output the light source information.

For the estimating of the light source information, the processor may be configured to estimate the light source information of the light source corresponding to the at least one object irrespective of whether the light source is included in the input image.

For the estimating of the light source information, the processor may be configured to estimate, based on an object region, light source information of a light source corresponding to the object region, wherein the object region corresponds to the at least one object detected in the input image.

In another general aspect, a processor-implemented rendering method includes: receiving a real input image and a virtual three-dimensional (3D) input object; detecting, using a trained neural network, a real object in the input image corresponding to the virtual object; estimating, using the trained neural network, light source information of a light source corresponding to the real object, based on the detected real object; and rendering, using the trained neural network, the virtual object in the real image based on the estimated light source information.

Other features and aspects will be apparent from the following detailed description, the drawings, and the claims.

Figure 1:
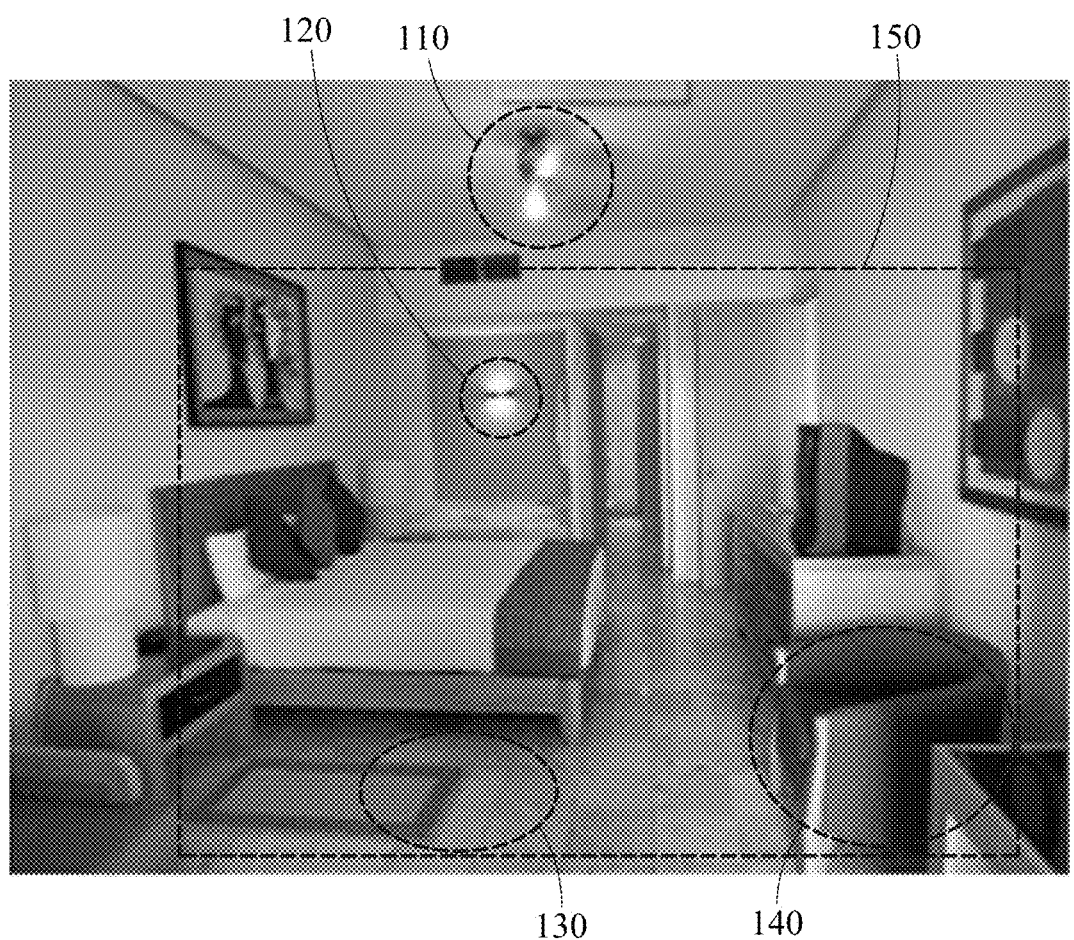
FIG. 1 illustrates an example of a method of outputting light source information.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the examples is not limited to the descriptions provided in the present specification. Like reference numerals in the drawings denote like elements, and a known function or configuration will be omitted herein.

Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be used to limit the disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, are to be interpreted as having a meaning that is consistent with their meaning in the context of the relevant art and the present disclosure, and are not to be interpreted in an idealized or overly formal sense unless expressly so defined herein.

FIG. 1 illustrates an example of a method of outputting light source information.

Referring to FIG. 1, an image 150 may be acquired using a camera by capturing an indoor place that includes a plurality of light sources 110 and 120 and at least one object 140. The light source 120 is included in the image 150, and the light source 110 is outside the image 150.

In an example, a "light source" may be an object that generates light with a brightness greater than or equal to a predetermined brightness, and may be understood to include both direct light and indirect light. Since ambient light with an intensity less than the predetermined brightness has little determined influence on colors during rendering of a three-dimensional (3D) object, the ambient light may not be included as a light source in an example embodiment. For example, when light by a light source has an intensity greater than or equal to a predetermined brightness, an output apparatus may detect the light as a light source regardless of whether the light is direct light or indirect light.

When the intensity of the light is less than the predetermined brightness, the output apparatus may not detect the light as a light source even when the light is direct light. An intensity of light of a light source may be measured based on, for example, lux indicating a brightness of light or RGB colors.

For example, a light source may include both natural light that indicates all ambient rays present (or a natural state) and artificial light that is artificially emitted by various lighting fixtures made using electric power. The natural light may include, for example, sunlight, moonlight, candlelight, and/or bonfires. The artificial light may include, for example, a neon sign, street light, a fluorescent lamp of a building, an incandescent lamp, a halogen lamp, a magnesium lamp, and/or vehicle light.

An apparatus (hereinafter, referred to as an "output apparatus") for outputting light source information may detect the at least one object 140 included in the image 150, may search for a light source based on a corresponding object 140, and may estimate light source information. The output apparatus may simultaneously or separately perform object detection and light estimation.

The image 150 may be broadly divided into a background region and an object region including the at least one object 140. The "background region" may be a region (for example, a bottom 130) that does not include, or is determined not to include, an object. The background region may occupy most of the image 150 but may not provide a clue for, or include information used to determine, light source information. The "object region" may be a region corresponding to the at least one object 140 in the image 150 (for example, a sofa, a chair, a television (TV), a bed, and/or a table). The object region may include various effects of light of a light source on the object 140, such as, for example, shading and/or shadows generated in or by the object 140, and thus the object region may provide information used to determine light source information (for example, a position of a light source). In an example, a single light source or a plurality of light sources may have an influence on, or may generate various effects on, the object 140.

A color shown at a point of the object 140 in the image 150 may be affected by various factors (for example, a shape and a material of an object, a light source, and/or a viewpoint). A color image including such color information of the object 140 may include, for example, albedo, reflectance, shading, and/or shadows. The albedo may be a unique color component or material characteristic of the object that is determined by the shape and the material of the object, regardless of the light source and the viewpoint.

For example, the object 140 that may include information used to determine light source information, or an object region including the object 140 may be detected using a pre-trained neural network, and light source information of a light source that has an influence on the object 140 may be estimated based on shading and shadows generated in or by the object 140 or the object region. The "shading" may correspond to a shade generated on an object to which light is radiated by a light source. The shading may indicate a luminous characteristic value when light from a light source reacts with a surface normal of an object. The shading may be information about a shading value determined by a vector inner product between a radiation direction of a light source and a surface normal of an object. The surface normal may be a normal direction component of a surface of a 3D object. For example, a change in the surface normal of the object may be estimated based on a change in the shading. The "shadow" may correspond to a shade generated by an object, to which light is radiated by a light source, in regions other than the object. In the present disclosure, the shading and the shadow may be referred to as "shading information" and "shadow information", respectively.

Hereinafter, for convenience of description, the object region may be understood to include both shading appearing in or on an object and a shadow region occupied by a shadow of the object, in addition to a region occupied by the object in the image 150.

For example, a shadow may be generated on a right side of the object 140 in the image 150. In this example, the shadow may be formed in an opposite direction of a light source around the object 140, and accordingly the output apparatus may estimate that the light source exists or is positioned on a left side of the object 140.

Also, a criterion may be used to obtain a position in a 3D space, and accordingly a position in a space may be more clearly expressed by setting a position based on the object 140 instead of setting the position based on the background region in the image 150.

The output apparatus may detect the at least one object 140 included in the image 150 and/or the object region including the object 140, and may estimate light source information corresponding to each of the at least one object. The light source information may include, for example, a position of at least one light source, a distance (d) to a light source, an intensity (i) of a light source, and/or a radiation direction ($\theta$, $\psi$) of a light source.

For example, the output apparatus may calculate a variation of a shadow value between adjacent pixels in the image 150, and may detect a region in which the variation of the shadow value is greater than a preset criterion (or threshold) as a boundary region of a shadow. The output apparatus may estimate a position (x, y) of a light source that exists or is positioned in a direction of a vector toward a boundary of the object 140 from pixels included in the boundary region of the shadow. The position (x, y) may in a 2D space such as a 2D space with respect to the image 150.

The output apparatus may more accurately estimate the position (x, y) of the light source based on shading information of the object 140. The output apparatus may estimate the position of the light source from the shading information, based on a shading value that increases as a distance between the object 140 and the light source decreases and as a surface normal of the object 140 coincides with a direction from the object 140 to the light source.

The output apparatus may estimate the position of the light source based on a maximum shading value included in the shading information. Shading information (for example, a shading value) of an object may gradually change based on a change in position of a pixel. The output apparatus may determine that a probability of a light source existing in a direction indicated by a normal vector of a pixel having the maximum shading value is high. For example, the output apparatus may estimate the position (x, y) of the light source based on a Lambert's cosine law that a radiant intensity or a light intensity observed from an ideal diffusely reflecting surface or an ideal diffuse radiator is directly proportional to a cosine of an angle $\theta$ between a surface normal and a direction of incident light. The position (x, y) of the light source may be, for example, a position of a light source corresponding to each of at least one object included in the image 150. The position of the light source may be a relative position of the light source with respect to the object 140, and may be, for example, a two-dimensional (2D) position (x, y) or a 3D relative position (x, y, z).

Also, the output apparatus may estimate a brightness of a light source based on shadow values of pixels included in a boundary region of a shadow. For example, the output apparatus may estimate that a brightness per unit area of the light source increases as a variation of a shadow value between adjacent pixels increases. For example, the output apparatus may estimate the brightness per unit area of the light source to be proportional to the variation of the shadow value between the adjacent pixels.

The light source information may include, for example, an effect by the light source 110 outside the image 150 as well as an effect by the light source 120 included in the image 150. Although the light source 120, not the light source 110, is included in the image 150, both the light source 110 on a ceiling and the light source 120 located on a wall may exist in a real space. Also, the object 140 in the space may be affected by both the light source 120 in the image 150 and the light source 110 that is not included in the image 150.

The output apparatus may estimate light source information of a light source corresponding to each of at least one object based on information about the object region and/or the object 140 recognized from the image 150, regardless of whether the light source is included in the image 150. For example, the output apparatus may estimate light source information based on both the light sources 110 and 120 corresponding to the object 140 from the image 150. The output apparatus may output the light source information externally, or may perform rendering by applying the light source information to a virtual object or an augmented reality (AR) object, to more naturally synthesize a 3D image. An example of a method of estimating light source information by the output apparatus will be further described below with reference to the following drawings.

Figure 2:
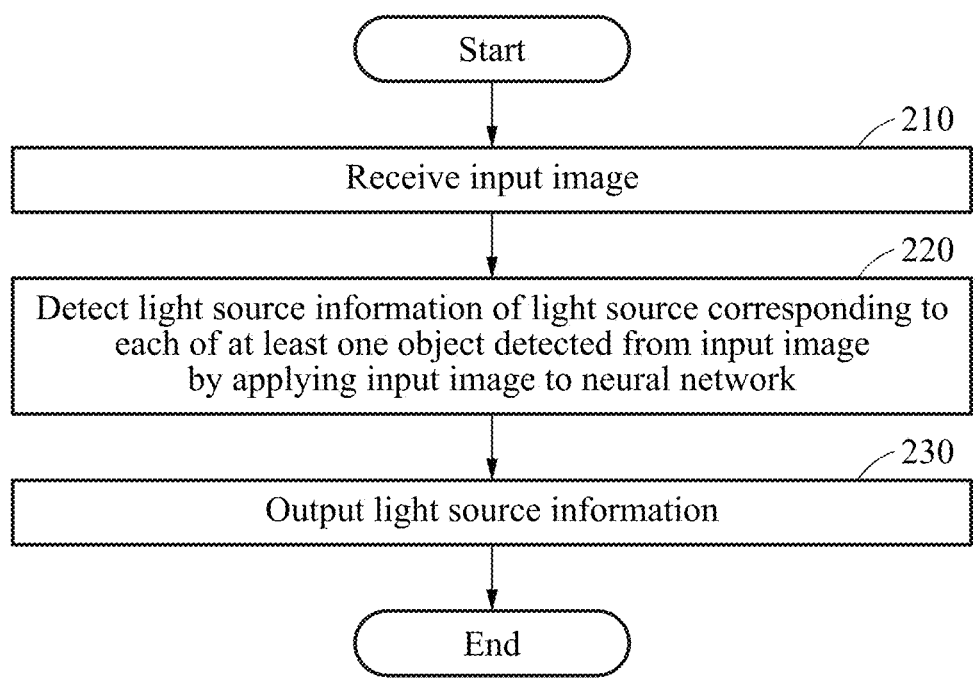
FIG. 2 illustrates an example of a method of outputting light source information.

FIG. 2 illustrates an example of a method of outputting light source information.

Referring to FIG. 2, in operation 210, an output apparatus may receive an input image. The output apparatus may directly obtain the input image using an image sensor or a depth sensor (for example, a sensor 640 of FIG. 6), or may receive the input image using a communication interface (for example, a communication interface 610 of FIG. 6). In an example, the image sensor and/or the depth sensor are included in the output apparatus. The input image may include, for example, a color image. Also, the input image may include, for example, a color image and a depth image. When the input image further includes a depth image, the output apparatus may more accurately estimate a position of a light source. The input image may be a 360-degree image captured using a high dynamic range (HDR) camera.

Figure 6:
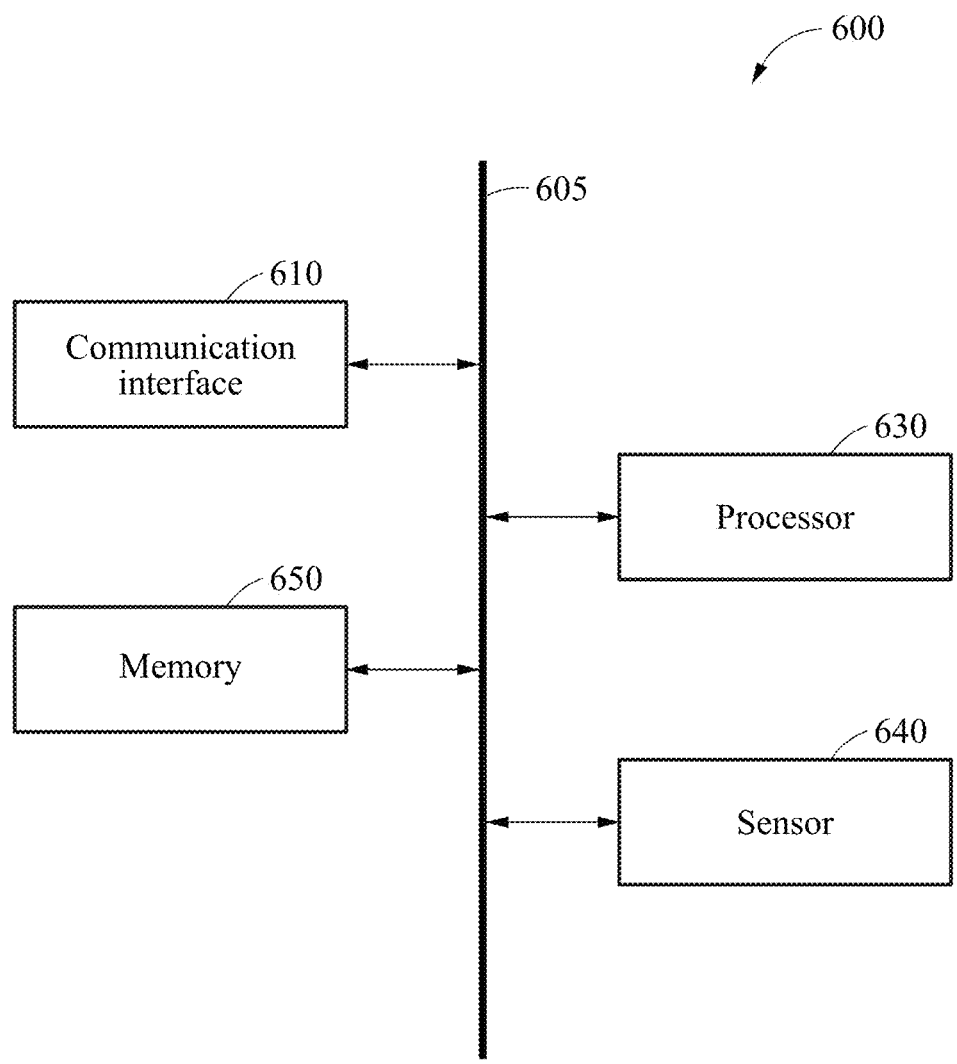
FIG. 6 illustrates an example of an apparatus for outputting light source information.

A color image may be obtained using an image sensor (for example, the sensor 640 of FIG. 6). The image sensor may be a device configured to obtain a color image (or a color frame) of an object, and may include, for example, a vision sensor, a complementary metal-oxide-semiconductor (CMOS) image sensor, a charge-coupled device (CCD) image sensor, or a stereo camera. The color image may include RGB color pixels, and each color pixel may have a color value.

A depth image may be obtained using a depth sensor (for example, the sensor 640 of FIG. 6). The depth sensor may be a device configured to obtain a depth image (or a depth frame) of the same object as the object of the color image, and may include, for example, a Kinect sensor for obtaining depth information based on a projected infrared pattern, a time-of-flight (TOF) depth camera, or an optical 3D scanner. The depth image may correspond to a color image and include depth pixels. Each depth pixel may have a depth value indicating distance information with respect to an object. For example, the color image obtained by the image sensor and the depth image obtained by the depth sensor may be provided to the output apparatus. In this example, the image sensor and the depth sensor may transfer a stream of color images and a stream of depth images to the output apparatus, respectively.

For example, when a stereo camera is used as an image sensor, the stereo camera may provide a stereo image including a right image and a left image to the output apparatus. In this example, a depth image may be generated from the stereo image using a well-known stereo matching scheme, and accordingly the output apparatus may obtain the depth image together with a color image including the left image and the right image from the stereo image, even though the depth image is not received from a separate depth sensor.

In operation 220, the output apparatus may detect at least one object from the input image received in operation 210, and may estimate light source information of a light source corresponding to each of the at least one object, by applying the input image to a trained neural network. The trained neural network may detect the at least one object included in the input image by generating a bounding box, and may detect object information including an object region corresponding to the at least one object in the input image. Simultaneously with or separately from the detecting of the at least one object and the object information, the trained neural network may to estimate the light source information of the light source corresponding to each of the at least one object based on a brightness of light of the light source.

For example, to estimate light source information, the neural network may be trained based on a template predefined based on at least one of a type of the light source and a type of a medium for transferring light by the light source. The template may correspond to training data. For example, in a training of the neural network, elements or parameters of the neural network may be iteratively updated until a determined loss or difference between a type of the light source (and/or a type of a medium for transferring light by the light source), estimated by the neural network based on the template, and the type of the light source (and/or the type of a medium for transferring light by the light source), predefined by the template, is less than or equal to a predetermined threshold. In an example, the type of the light source may include both a type of natural light (for example, sunlight, moonlight, candlelight, and/or bonfires) and a type of artificial light (for example, a neon sign, street light, a fluorescent lamp of a building, an incandescent lamp, a halogen lamp, a magnesium lamp, and/or vehicle light). The medium for transferring light by the light source may correspond to a target that transmits an effect of a light source to an object by passing light of the light source and may include, for example, a light case, a fluorescent lamp cover, and various types of windows through which sunlight passes.

For example, when an intensity or a brightness of light of a light source is greater than a preset criterion (or threshold), the trained neural network may estimate light source information of the light source. Accordingly, ambient light may be excluded from a light source since the ambient light having an intensity of light less than or equal to a predetermined intensity has little influence on colors during rendering.

In operation 220, the output apparatus may estimate light source information of a light source corresponding to an object region including the at least one object detected from the input image by applying the at least one object to the neural network. To estimate a radiation direction of the light source information, the neural network may be trained based on a template in which a direction of a shadow generated for each object corresponding to a radiation direction of the light source is pre-labeled. The template may correspond to training data. For example, in a training of the neural network, elements or parameters of the neural network may be iteratively updated until a determined loss or difference between a radiation direction of the light source, estimated by the neural network based on an estimated direction of a shadow of an object of the template, and a radiation direction of the light source, pre-labeled by the template, is less than or equal to a predetermined threshold.

An example of a process of estimating light source information using a neural network will be further described below with reference to FIG. 3.

Depending on examples, an input image may include sequential partial images that include any one or any combination of at least one light source and at least one object. An example of a method of estimating light source information when an input image includes sequential partial images will be further described below with reference to FIG. 4.

In operation 230, the output apparatus may output the light source information estimated in operation 220. For example, the output apparatus may output the light source information in a form of a lighting parameter corresponding to each, or any one or any combination, of a relative position of a light source corresponding to each of the at least one object, a distance to the light source, a brightness of the light source, and a radiation direction of the light source with respect to the at least one object.

Figure 3:
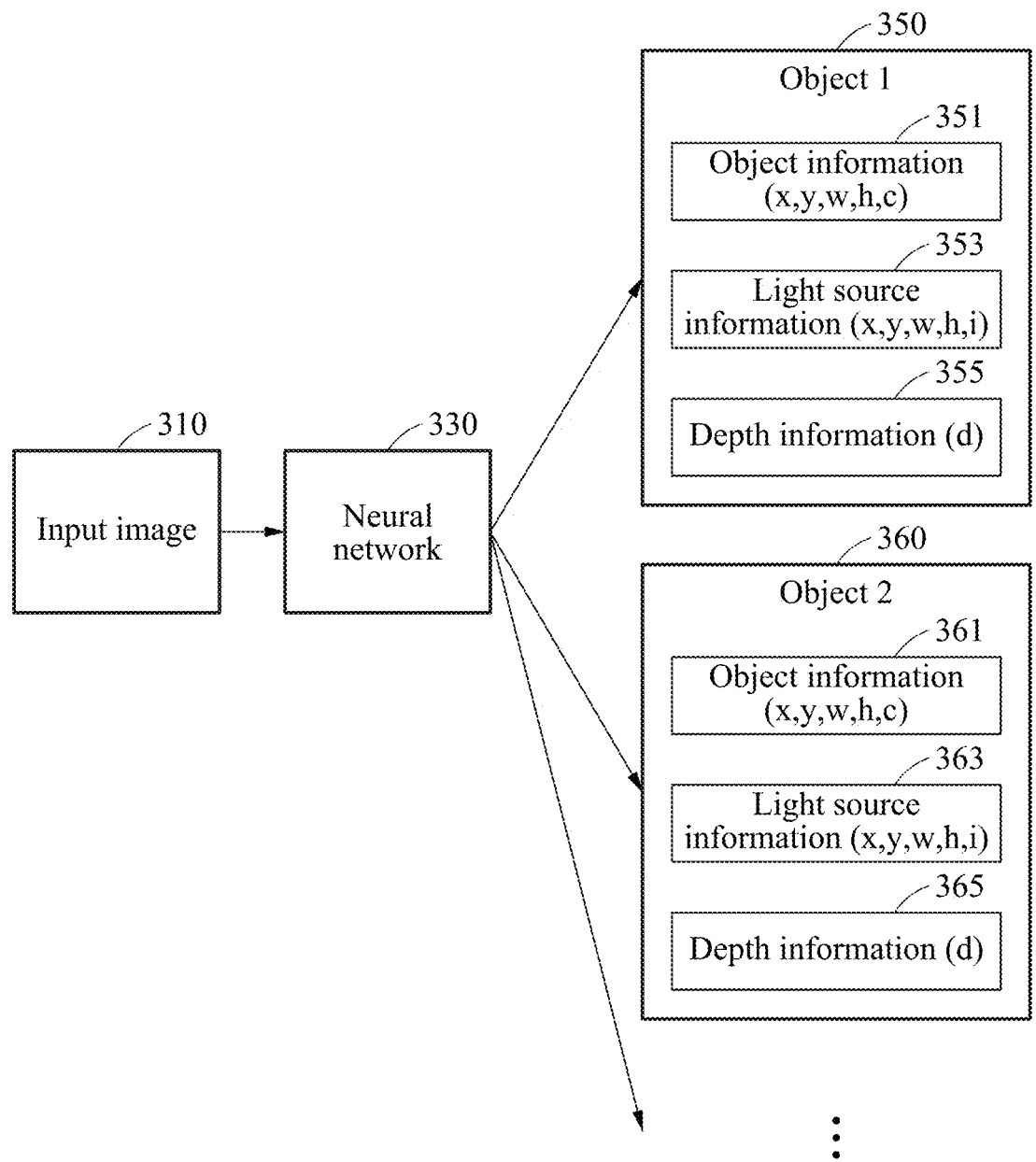
FIG. 3 illustrates an example of an operation of a neural network to estimate light source information.

FIG. 3 illustrates an example of an operation of a neural network (for example, a neural network 330) to estimate light source information.

Referring to FIG. 3, light source information 350 and 360 for each object may be output through the neural network 330 when an input image 310 is applied to the neural network 330. For example, the input image 310 may include object 1 and object 2.

The neural network 330 may include, for example, any one or any combination of a deep neural network (DNN) that is a nonlinear machine learning model, a convolutional long short-term memory (LSTM) neural network, and a recurrent neural network (RNN). The DNN may be a neural network trained through a deep learning scheme. In the deep learning scheme, the input image 310 may be classified and trained by the neural network 330.

An output apparatus may detect at least one object included in the input image 310 and may estimate the light source information 350 and 360 of light sources for each of the least one object, using the neural network 330. The light source information 350 may correspond to the object 1, and the light source information 360 may correspond to the object 2.

The neural network 330 may simultaneously or separately infer object information 351 and 361, light source information 353 and 363, and depth information 355 and 365 for each of a plurality of objects (for example, the objects 1 and 2) included in the input image 310. The light source information 353 and 363 may include a relative position of a light source with respect to a corresponding object. The neural network 330 may estimate the depth information 355 and 365 corresponding to each object as separate information, as shown in FIG. 3, or as a portion of light source information.

For example, the neural network 330 may be trained to detect the object information 351 and 361 that include a pixel position corresponding to the at least one object in the input image 310, a size of a bounding box corresponding to the at least one object, and a class of the at least one object.

The object information 351 and 361 may include, for example, any one or any combination of a position (x, y) of the at least one object, a size (w, h) of the at least one object, and a class (c) of the at least one object. The position (x, y) may correspond to a position (x, y) of a pixel corresponding to the at least one object in the input image 310. The position (x, y) may in a 2D space such as a 2D space with respect to the input image 310. Also, a position of an object may be represented in a form of an angle based on 360 degrees in a horizontal direction and 180 degrees in a vertical direction when an input image is a 360-degree image. The size (w, h) may be approximated by a size, for example, a width and a height, of a bounding box to detect an object. The size (w, h) may be a pixel width and height, in an example. For example, a size of an object may be detected by mapping an object detected from the input image 310 to one of shapes of object candidates that are provided in advance.

The neural network 330 may estimate light source information 353 and 363 of light sources corresponding to an object region, based on at least one object detected from the input image 310 or the object region. The object region may correspond to the at least one object. In this example, to estimate a radiation direction of the light source information, the neural network 330 may be trained based on a template in which a direction of a shadow generated for each object corresponding to a radiation direction of a light source is pre-labeled. The template may correspond to training data. For example, in a training of the neural network, elements or parameters of the neural network 330 may be iteratively updated until a determined loss or difference between a radiation direction of the light source, estimated by the neural network 330 based on an estimated direction of a shadow of an object of the template, and a radiation direction of the light source, pre-labeled by the template, is less than or equal to a predetermined threshold. For example, when light is radiated from a light source to an object, a position of a shadow corresponding to the object may vary depending on a direction in which the light is radiated. In this example, the neural network 330 may perform inferring by generating a bounding box around the object, to determine a direction of the light source by an object region including the shadow. Also, a bounding box for shadow detection may have a size 1.5 times a size of a bounding box for object detection. The light source information 353 and 363 may include a position (x, y) of a light source with respect to an object, a radiation direction (θ, ψ) of the light source, and a brightness or intensity (i) of the light source.

The neural network 330 may extract shading information of color pixels from the input image 310. The neural network 330 may further extract albedo information. The shading information may include surface normal information indicating a surface normal component of an object. For example, a color of each of color pixels included in a color image may be expressed by a product of a shading component and an albedo component that is a unique color of the object. Based on properties that the albedo component changes sharply and the shading component changes relatively smoothly in a color space, the albedo component and the shading component may be separated from the color image. For example, when a color changes between adjacent color pixels, the albedo component may represent a discontinuity, whereas the shading component may represent a continuity. Based on the above characteristic, the neural network 330 may extract the albedo component and the shading component from the color image.

The shading component may be determined by a vector inner product between a radiation direction of a light source and a surface normal of an object. Thus, when assuming that the radiation direction of the light source is known or the radiation direction of the light source is uniform in the entire region of the color image, a change in the surface normal component may be estimated based on a change in the shading component. Even when the radiation direction of the light source is non-uniform or a plurality of light sources are present, the neural network 330 may estimate the change in the surface normal component based on the change in the shading component.

The neural network 330 may extract visibility information from a depth image and a color image. The neural network 330 may extract the surface normal information from the shading information. Also, the neural network 330 may extract the surface normal information directly from an input image through deep learning. The neural network 330 may extract the visibility information based on depth information of the depth image and the surface normal information.

The neural network 330 may extract the visibility information based on various combinations of shape information (for example, the depth information, the surface normal information, or the 3D bounding box information). Also, the neural network 330 may extract the visibility information directly from the color image through deep learning.

The "visibility information" may be information indicating a degree to which a region around an object is occluded at each point of an image. The visibility information may be easily calculated when a shape of the region around the object is known. However, when information indicating an occlusion by a volume in a direction from points around the object toward the object is analyzed through training in advance, the neural network 330 may immediately determine the visibility information even though the shape of the region around the object is not clearly obtained. For example, when a vehicle on a road is recognized in a color image, an occlusion by a volume in a direction from points around the vehicle toward the vehicle, that is, visibility information of the vehicle may be determined.

The neural network 330 may calculate a direction corresponding to a difference between visibility information of pixels included in a region of an input image in which shading values of adjacent pixels change. The output apparatus may estimate a final position (x, y) of the light source by integrating directions calculated from a plurality of pixels.

The neural network 330 may estimate a light source based on the shading information. The neural network 330 may estimate a brightness or intensity (i) and a position (x, y) of the light source based on the shading information and shape information of a background region. Based on a principle that a shadow appears on an opposite side of a light source from an object, the neural network 330 may estimate the position (x, y) of the light source. The neural network 330 may extract a shadow boundary region from the shading information, and may estimate the position (x, y) of the light source based on visibility information of the shadow boundary region. The neural network 330 may estimate the position (x, y) of the light source based on a visibility information difference, for example, a visibility delta, between adjacent pixels included in the shadow boundary region.

The neural network 330 may determine whether a pixel of an input image corresponds to a boundary region of a shadow based on a variation of a shadow value of a pixel of the input image and a threshold. In an ideal example in which the light source is a point light source, a boundary region of a shadow generated by an object may have a width of "0". However, since the light source may be a surface light source, the boundary region of the shadow may have an area, and each pixel may have a different shadow value in the boundary region of the shadow. The neural network 330 may compare the variation of the shadow value to the threshold, to determine whether the corresponding pixel is included in the boundary region of the shadow.

The neural network 330 may estimate the brightness or intensity (i) of the light source based on the shadow value of the shadow boundary region. When an area of the light source increases, the shadow boundary region may widen, and a variation of a shadow value in the shadow boundary region may decrease. The neural network 330 may estimate the brightness or intensity (i) of the light source by calculating the variation of the shadow value in the shadow boundary region.

Also, the neural network 330 may estimate the position (x, y) and radiation direction (θ, ψ) of the light source based on the shading information. For example, a distance between an object and a light source may decrease or a normal direction of a surface of the object may face the light source, when a shading value of the object increases, and thus the output apparatus may estimate the position (x, y) and radiation direction (θ, ψ) of the light source based on the shading information.

Depending on examples, the neural network 330 may obtain context information from the input image 310. For example, when the input image 310 is an image acquired by capturing an indoor space, the context information may be information indicating that the input image 310 represents the indoor space. The neural network 330 may extract information indicating that the input image 310 is an image acquired by capturing an indoor space, through training. In another example, the context information may be information obtained separately from the input image 310.

The neural network 330 may estimate a light source based on the shading information and the context information. The neural network 330 may determine an environment to which a background belongs from the input image 310, through training. The neural network 330 may calculate a probability of the light source being present in each region of the input image 310 based on information related to a probability of a light source being present based on a position, corresponding to an identified environment. For example, when the context information indicates that the input image 310 is of an indoor place, the neural network 330 may determine that a probability of a position of the light source being at a portion corresponding to a ceiling in the input image 310 is high. The neural network 330 may estimate the position of the light source based on the probability of existence of the light source.

Also, the neural network 330 may estimate the brightness or intensity (i) of the light source based on shadow values of pixels included in the shadow boundary region. For example, the output apparatus may estimate that a brightness per unit area of the light source increases as a variation of a shadow value between adjacent pixels increases.

The neural network 330 may output depth information (d) indicating a distance from an object to a light source as depth information 355 and 365, as shown in FIG. 3, or may output the depth information (d) as a factor of the light source information 353 and 363. For example, the depth information (d) may be output from a depth information field included in an output channel of the neural network 330.

Figure 4:
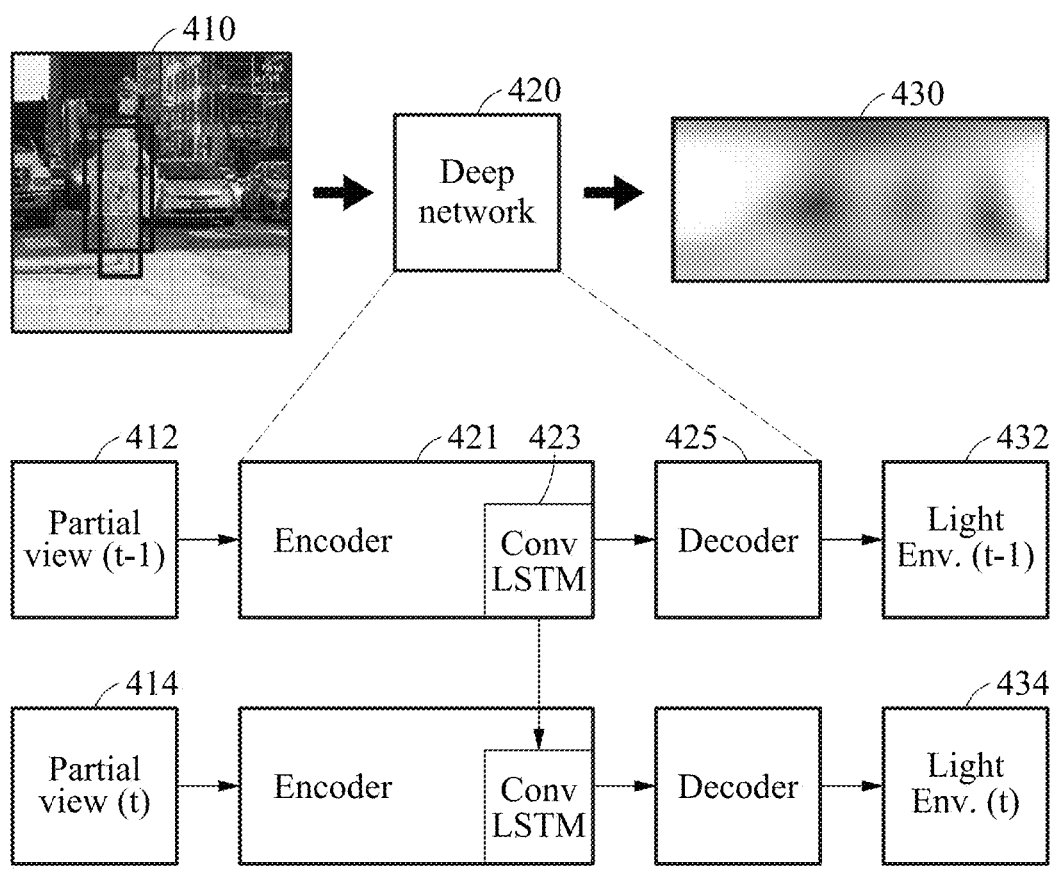
FIG. 4 illustrates an example of a structure of a neural network to estimate light source information.

FIG. 4 illustrates an example of a structure of a neural network (for example, a neural network 420) to estimate light source information.

Referring to FIG. 4, an output image 430 may be output from the neural network 420 that receives an input image 410. The output image 430 may be, for example, an image reflecting light source information.

The input image 410 may include sequential partial images 412 and 414 including any one or any combination of at least one light source and at least one object. The partial image 412 may be an image corresponding to a time t−1, and the partial image 414 may be an image corresponding to a time t.

The neural network 420 may estimate light source information 432 and 434 respectively corresponding to the partial images 412 and 414, further based on a change in a shadow generated based on a change in light in a region of at least one object included in the partial images 412 and 414.

For example, the neural network 420 may detect a person as an object included in the sequential partial images 412 and 414. In this example, the neural network 420 may express a position of the person (that is, the object) as a pixel position (x, y), and may determine a size of a bounding box including the object as a size (w, h) of the object. Also, the neural network 420 may determine that the object corresponds to a class (for example, persons).

When object information corresponding to an object (for example, a person) included in the input image 410 is detected as described above, the neural network 420 may estimate light source information including a position of a light source with respect to the object, simultaneously with or after detection of the light source.

The neural network 420 may include an encoder 421 and a decoder 425. The encoder 421 includes a convolutional long short-term memory (LSTM) 423.

The encoder 421 may sequentially extract features corresponding to an object from the partial images 412 and 414, and may determine spatial and temporal information from the extracted features using the convolutional LSTM 423.

The decoder 425 may restore RGB color information and a depth based on context information extracted using the convolutional LSTM 423.

Figure 5:
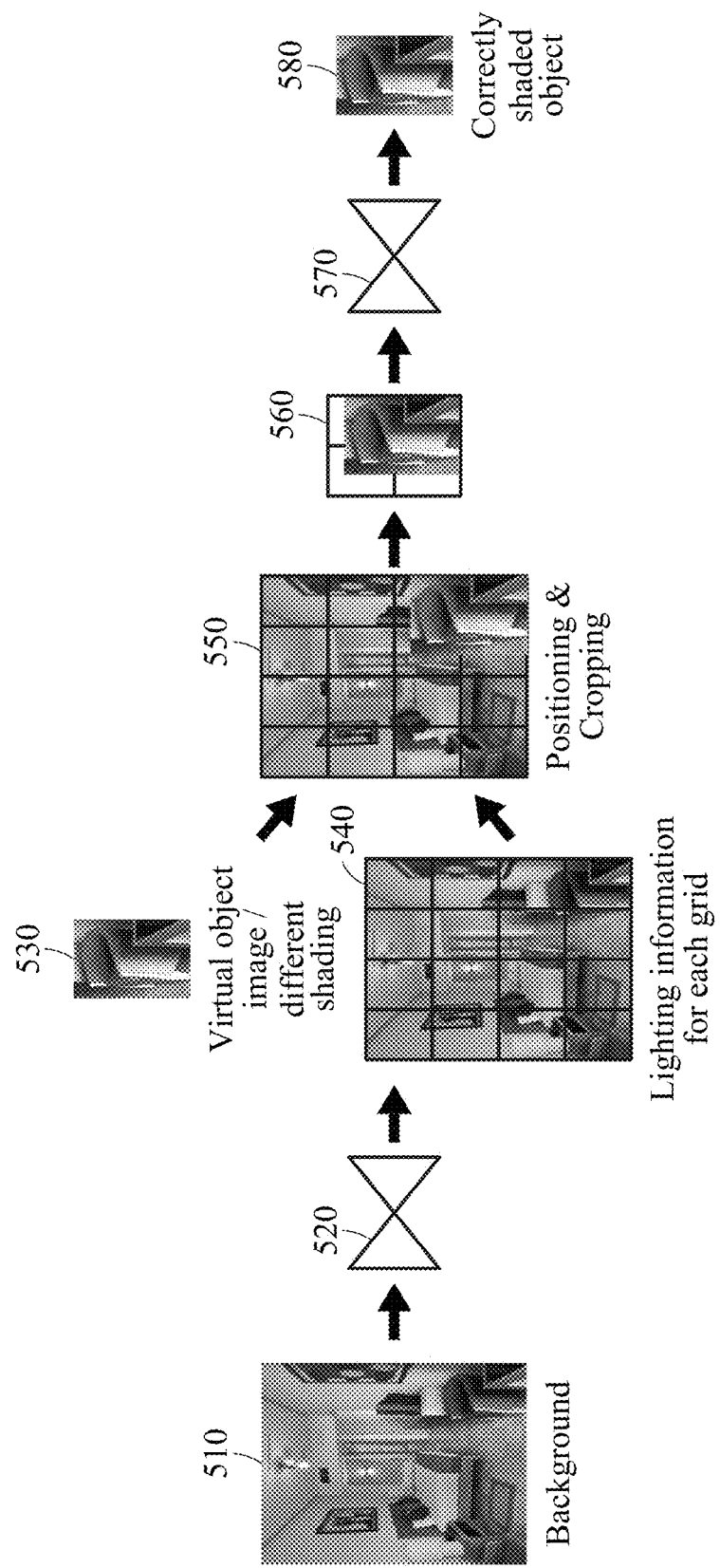
FIG. 5 illustrates an example of a process of rendering a three-dimensional (3D) object based on light source information.

FIG. 5 illustrates an example of a process of rendering a 3D object based on light source information.

Referring to FIG. 5, a process of rendering a 3D object may be based on light source information that is estimated using a neural network 520. The light source information may correspond to light source information of a light source corresponding to each object included in an input image 510.

An output apparatus may perform 3D rendering by estimating a light source and calculating a phenomenon caused by, or resulting from, the estimated light source, to generate a more natural and realistic 3D rendering image.

For example, the output apparatus may detect at least one object from the input image 510 and may estimate light source information of a light source corresponding to each of the at least one object, by applying the input image 510 to the neural network 520. In this example, the output apparatus may partition the input image 510 into grids and may estimate light source information for each grid in operation 540.

In operation 530, the output apparatus may receive, as an input, a selection of a 3D object from a user. In operation 550, the output apparatus may determine a position in which the 3D object is to be disposed in the input image 510, based on the light source information estimated in operation 540. In operation 560, the output apparatus may crop an image corresponding to the position determined in operation 550, and may apply the 3D object to the position. The 3D object may include, for example, an AR object, a virtual object, a holographic object, and/or a mixed object. The output apparatus may calculate shading values of an object for each pixel using surface normal information of the object based on a direction and an intensity of light from a light source of the light source information. The output apparatus may calculate shadow values of a background or another object in the input image for each pixel based on shape information of the object and a light source.

In operation 580, the output apparatus may render the 3D object by reflecting a shadow and a shade of the 3D object using a neural network 570. The output apparatus may output the rendered 3D image.

The output apparatus may generate a 3D rendering image by combining shape information of a background region, the estimated light source, and the input image with shape information of an object. The light source may be estimated based on information included in an existing input image, and thus a natural effect that conforms to the input image may be generated. Since the light source is newly defined in 3D, a more natural effect may be applied to an object to be inserted into the input image.

The output apparatus may be or include, for example, a personal computer (PC), a laptop, a notebook, a netbook, a tablet, a personal digital assistant (PDA), a navigation system, a home appliance, an image processing apparatus, a smartphone, a 3D TV, and/or a digital information display (DID), but is not limited thereto. The 3D image rendered by the output apparatus may be used to implement a 3D user interface (UI), 3D content, a virtual reality (VR), or an AR.

FIG. 6 illustrates an example of an output apparatus (for example, an output apparatus 600) for outputting light source information.

Referring to FIG. 6, the output apparatus 600 may include the communication interface 610, a processor 630 (e.g., one or more processors), a sensor 640, and a memory 650. The communication interface 610, the processor 630, the sensor 640, and the memory 650 may be connected to each other via a communication bus 605.

The communication interface 610 may receive an input image. The communication interface 610 may output light source information. The communication interface 610 may receive the input image externally, such as from an external apparatus. The sensor 640 may be or include an image sensor and/or a depth sensor. In an example, the sensor 640 may obtain the input image.

The processor 630 may detect at least one object from the input image by applying the input image to a neural network. The processor 630 may estimate light source information of a light source corresponding to each of the at least one object.

The processor 630 may estimate light source information of a light source corresponding to an object region, based on the object region. The object region may correspond to the at least one object detected from the input image. The processor 630 may estimate light source information of a light source corresponding to each of the at least one object, regardless of whether a light source is included in the input image.

The memory 650 may store the input image received through the communication interface 610. Also, the the memory 650 may store the at least one object detected by the processor 630 and/or the light source information estimated by the processor 630.

Depending on examples, the communication interface 610 may output the light source information estimated by the processor 630, or may provide the light source information to another apparatus.

Also, the processor 630 may perform at least one of the methods described above with reference to FIGS. 1 through 5 or an algorithm corresponding to at least one of the methods. The processor 630 may be a hardware-implemented data processing device having a circuit that is physically structured to execute desired operations. For example, the desired operations may include code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 630 may execute a program and may control the output apparatus 600. Codes of the program executed by the processor 630 may be stored in the memory 650.

The memory 650 may store a variety of information generated in a processing process of the above-described processor 630. Also, the memory 650 may store a variety of data and programs. The memory 650 may include, for example, a volatile memory or a non-volatile memory. The memory 650 may include a large-capacity storage medium such as a hard disk to store a variety of data.

The apparatuses, units, modules, devices, and other components described herein with reference to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that may be configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that may be configured to store the instructions or software and any associated data, data files, and data structures in a non-transitory manner and providing the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented light source information output method, the method comprising:
   receiving an input image;
   detecting, using a trained neural network, at least one object in the input image;
   estimating, using the trained neural network, light source information of a light source corresponding to the at least one object; and
   outputting the light source information.

2. The method of claim 1, wherein the estimating of the light source information comprises estimating the light source information of the light source corresponding to the at least one object irrespective of whether the light source is included in the input image.

3. The method of claim 1, wherein the estimating of the light source information comprises estimating, based on an object region, light source information of a light source corresponding to the object region, wherein the object region corresponds to the at least one object detected in the input image.

4. The method of claim 3, wherein the detecting of the at least one object comprises detecting shadow information generated by the at least one object in the object region, and the estimating of the light source information is based on the detected shadow information.

5. The method of claim 3, wherein the detecting of the at least one object comprises detecting shading information on the at least one object in the object region, and the estimating of the light source information is based on the detected shading information.

6. The method of claim 1, wherein
   the detecting, using the trained neural network, of the at least one object in the input image comprises generating a bounding box and detecting object information including an object region corresponding to the at least one object in the input image, and
   the estimating, using the trained neural network, of the light source information of the light source corresponding to the at least one object is based on a brightness of light of the light source.

7. The method of claim 6, wherein the estimating, using the trained neural network, of the light source information of the light source is in response to the brightness of the light of the light source being greater than a preset threshold.

8. The method of claim 6, wherein the object information comprises any one or any combination of a position of the at least one object, a size of the at least one object, and a class of the at least one object.

9. The method of claim 1, wherein the light source information comprises any one or any combination of a position of the light source, a distance to the light source, a brightness or an intensity of the light source, and a radiation direction of the light source.

10. The method of claim 1, wherein the neural network is trained to estimate the light source based on a template predefined based on at least one of a type of the light source and a type of a medium for transferring light by the light source.

11. The method of claim 1, wherein the neural network is trained to estimate the light source information based on a template in which a direction of a shadow generated by the at least one object corresponding to a radiation direction of the light source is pre-labeled.

12. The method of claim 1, wherein the light source information comprises a lighting parameter corresponding to each of a relative position of a light source corresponding to each of the at least one object, a distance to the light source, a brightness of the light source, and a radiation direction of the light source with respect to the at least one object.

13. The method of claim 1, wherein the light source comprises either one or both of direct light and indirect light.

14. The method of claim 1, wherein the input image comprises sequential partial images that comprise any one or any combination of at least one light source and the at least one object.

15. The method of claim 14, wherein the estimating of the light source information comprises estimating the light source information based on a change in a shadow caused by a change in light of the light source in a region of the at least one object included in the sequential partial images.

16. The method of claim 1, further comprising:
   receiving, as an input, a selection of a three-dimensional (3D) object from a user; and
   rendering the 3D object in the input image based on the light source information.

17. The method of claim 16, wherein
   the estimating of the light source information comprises partitioning the input image into grids and estimating the light source information for each of the grids, and the rendering of the 3D object comprises:
  determining, based on the light source information estimated for each of the grids, a position in which the 3D object is to be disposed in the input image; and
  rendering the 3D object in the determined position.

18. The method of claim 1, wherein the neural network comprises any one or any combination of a deep neural network (DNN), a convolutional long short-term memory (LSTM) neural network, and a recurrent neural network (RNN).

19. A non-transitory computer-readable storage medium storing instructions that, when executed by a processor, configure the processor to perform the method of claim 1.

20. A light source information output apparatus, the apparatus comprising:
  a communication interface configured to receive an input image; and
  a processor configured to:
    detect, using a trained neural network, at least one object in the input image; and
    estimate, using the trained neural network, light source information of a light source corresponding to the at least one object,
  wherein the communication interface is configured to output the light source information.

21. The apparatus of claim 20, wherein, for the estimating of the light source information, the processor is configured to estimate the light source information of the light source corresponding to the at least one object irrespective of whether the light source is included in the input image.

22. The apparatus of claim 20, wherein, for the estimating of the light source information, the processor is configured to estimate, based on an object region, light source information of a light source corresponding to the object region, wherein the object region corresponds to the at least one object detected in the input image.

23. A processor-implemented rendering method, the method comprising:
  receiving a real input image and a virtual three-dimensional (3D) input object;
  detecting, using a trained neural network, a real object in the input image corresponding to the virtual object;
  estimating, using the trained neural network, light source information of a light source corresponding to the real object, based on the detected real object; and
  rendering, using the trained neural network, the virtual object in the real image based on the estimated light source information.

* * * * *